June 20, 1972    E. B. WESTLAKE, JR    3,671,350
METHOD OF PRODUCING A PLASTIC SHOPPING BAG
Filed Dec. 24, 1969      3 Sheets-Sheet 1
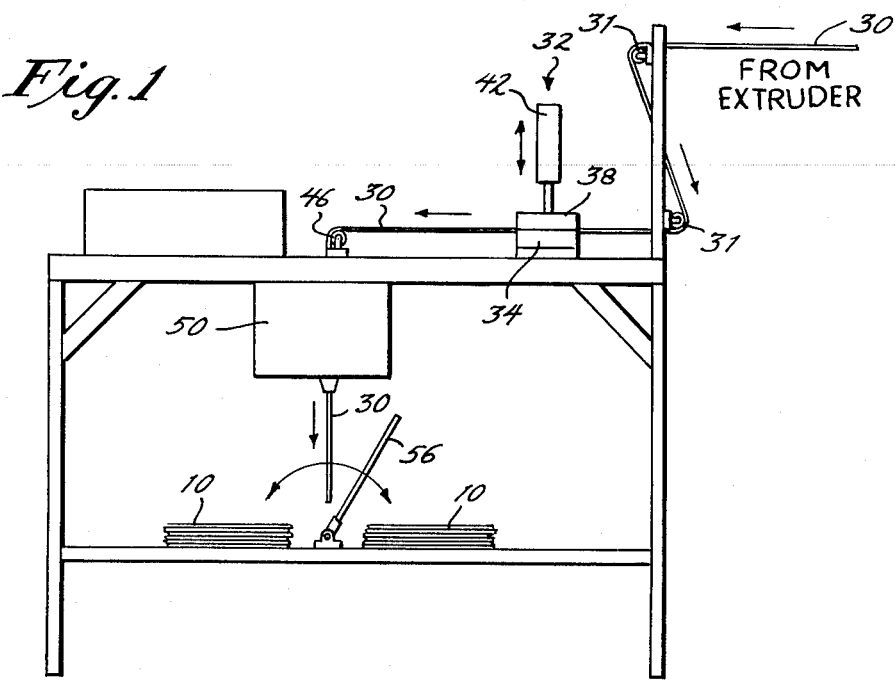
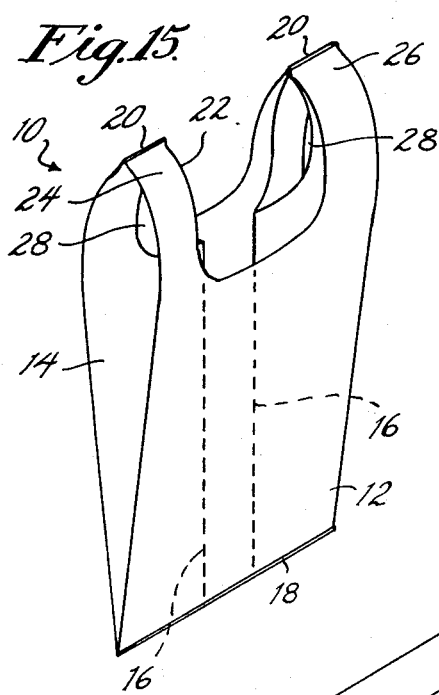
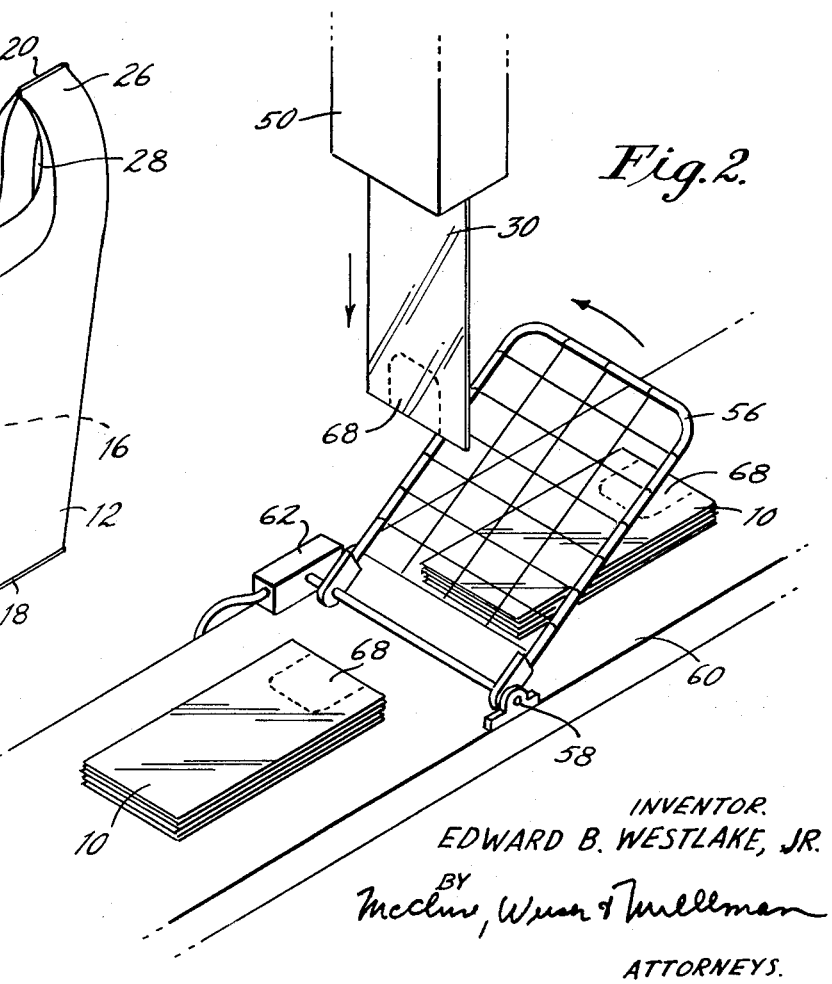
INVENTOR.
EDWARD B. WESTLAKE, JR.
BY
McClew, Weiser & Mullman
ATTORNEYS.

June 20, 1972     E. B. WESTLAKE, JR     3,671,350
METHOD OF PRODUCING A PLASTIC SHOPPING BAG
Filed Dec. 24, 1969     3 Sheets-Sheet 2
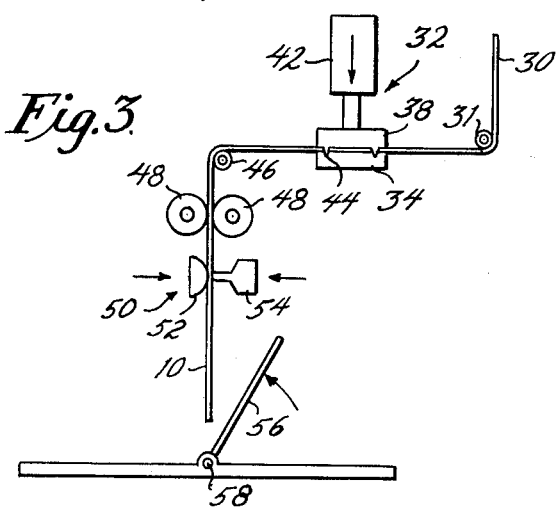
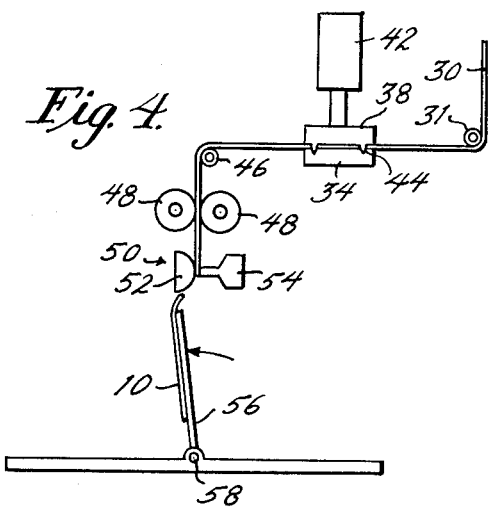
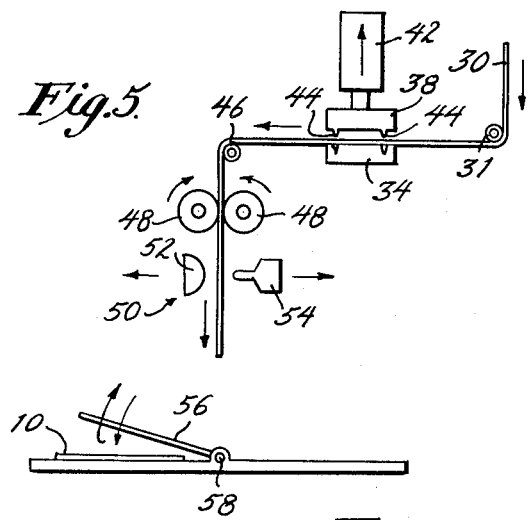
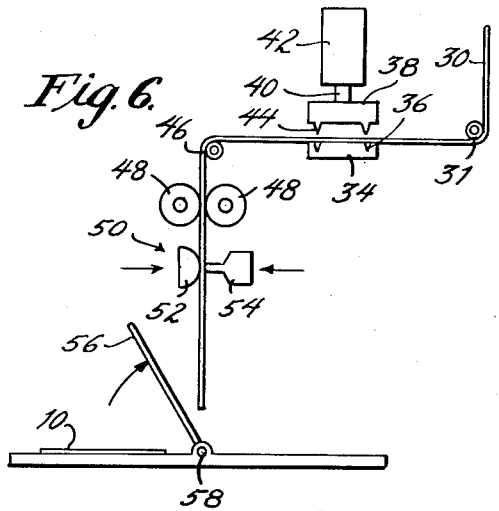
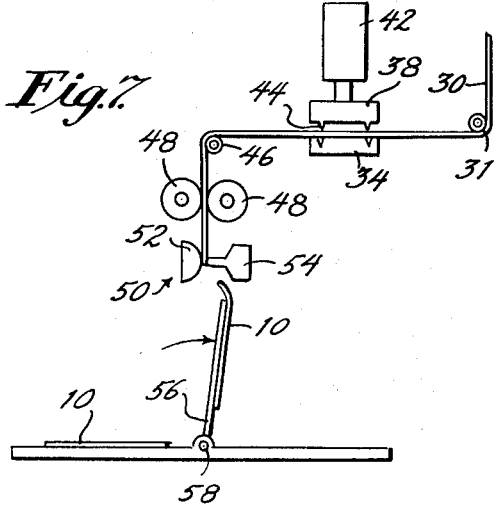
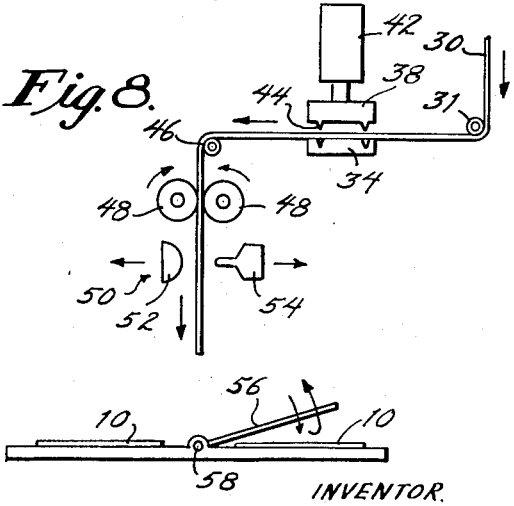
INVENTOR.
EDWARD B. WESTLAKE, JR.
BY
McClure, Weiser & Millman
ATTORNEYS.

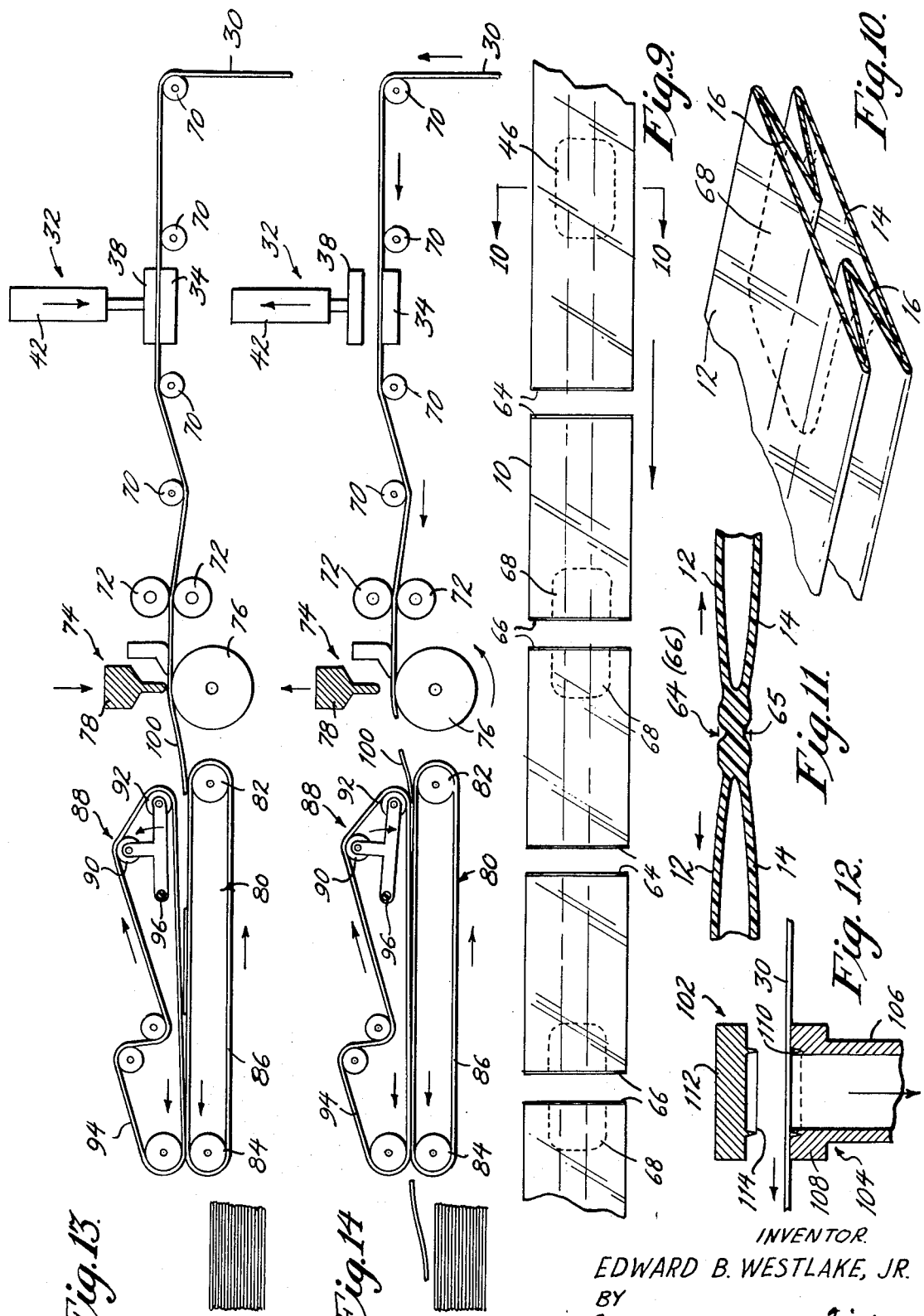

United States Patent Office 3,671,350
Patented June 20, 1972

3,671,350
METHOD OF PRODUCING A PLASTIC
SHOPPING BAG
Edward B. Westlake, Jr., 307 Lincoln Ave.,
Havertown, Pa. 19203
Filed Dec. 24, 1969, Ser. No. 887,807
Int. Cl. B32b 31/08, 31/20
U.S. Cl. 156—250
5 Claims

ABSTRACT OF THE DISCLOSURE

Method for making an over-the-arm plastic bag of polyethylene and similar thermoplastic resins which comprises feeding tubular side-gusseted plastic stock through a perforator or cutter station and then through a heat sealing station where a generally rectangular perforated or cut area is produced every two bag lengths in the front and back panels and gussets of the stock and the heat sealing and severing is effected simultaneously transversely of the stock centrally between the perforated or cut areas to form the bottoms of the bags and transversely across and bisecting the perforated or cut area to produce the tops of the bags without opening the welds themselves.

---

This invention relates to a novel method and apparatus for making an over-the-arm plastic shopping bag.

In the past few years a plastic shopping bag has been in use which consists of a substantially tubular body member sealed at one of its ends to form a bottom and provided at its other end with a central cut-out or waste portion forming a central filler opening and laterally spaced handles with openings extending from the central filler opening to the sides of the bag through which an arm can be extended to suspend the bag therefrom. Bags of this type are shown and described in U.S. Pat. 3,352,-411, Swiss Pat. 405,051 and 418,807 and French Pats. 1,435,950 and 1,463,187.

The primary object of this invention is to provide a method and apparatus for making an over-the-arm plastic bag of the character above described, especially the side-gusseted bag, which is efficient and therefore reduces the unit price of the bags, which produces a strong bag because of the nature of the seals or welds formed, and which improves the appearance of the bag.

The foregoing advantages are attained in a process and apparatus in which the tubular plastic stock, preferably side-gusseted, is fed to a perforating or cutting station where a perforated or cut area is provided in the opposite sides and gussets of the stock with centers separated twice the desired length of each bag, then the stock is fed to a simultaneous sealing and severing station where the stock is heat sealed to form a thickened relaxed weld between the perforated or cut areas and simultaneously pulled apart or severed and then the same heat sealing and severing is carried out centrally across the perforated or cut area and the process repeated.

Another object of the invention is to provide a process as above-described which can be carried out continuously in an in-line operation in which the stock is fed directly from an extruder through a perforating station and then vertically through a heat sealing zone where a means is used to engage the sealed bag to exert a pulling force thereon sufficient to separate the bag at the seal, the means also serving to stack the bags on both sides of the sealing station.

Another object of the invention is to provide a process as above-described in which the tubular stock is fed from a roller through a horizontal bed where the perforated or cut area is first applied and then the stock passes beneath a heat sealer and roller means are employed synchronously with the perforating and sealing operation to engage the bags when the seal has been applied and thus separate them.

Other objects and features of the invention will become more apparent as the following description proceeds in conjunction with the accompanying drawings, wherein:

FIG. 1 is a diagrammatic elevational view of an in-line machine embodying the invention;

FIG. 2 is a perspective view of a detail of the machine, namely the swing arm for engaging the sealed plastic tubular stock;

FIGS. 3–8 are diagrammatic views of a complete cycle of the process carried out by the machine shown in FIGS. 1 and 2;

FIG. 9 is a plan view of tubular plastic stock illustrating the locations and sequence of perforating, sealing and severing the stock into bag lengths;

FIG. 10 is an enlarged sectional view taken on the line 10—10 of FIG. 9 showing the condition of the stock after perforation;

FIG. 11 is an enlarged sectional view showing the formation of the relaxed seal or weld and the severing of the same into two bag units;

FIG. 12 is a fragmentary enlarged vertical sectional view of a means to form a cut rather than a perforated area in the stock before it is fed to the sealing and severing station;

FIGS. 13 and 14 are diagrammatic views of a modified form of machine embodying the invention in which the perforating, sealing, and severing are carried out in a generally horizontal plane; and FIG. 15 is a perspective view of the side-gusseted plastic bag made by the instant invention.

Specific reference is now made to the drawings wherein similar reference characters are used for corresponding elements throughout.

As seen in FIG. 15 the bag 10 made by the instant invention is made of polyethylene, polypropylene or similar thermoplastic synthetic resins and comprises front and back panels 12 and 14 with side folds or gussets 16 running lengthwise thereof, a transverse weld 18 at one end thereof forming the bottom, a transverse weld 20 at the upper end thereof and a cut-out or waste portion 22 opening centrally through the upper end which is also cut through the gussets or folds to thereby form handle portions 24 and 26 with laterally extending openings 28 through which an arm may be extended to suspend the bag.

Generally such bags are made by heat sealing predetermined lengths of the gusseted tubular stock to form a bag and then cutting out a central waste portion at one end to form the handles and the arm holes. Such a method is time-consuming and frequently results in a bag with tails extending beyond the weld area not only at the bottom but also at the top or handle portions which are unsightly and annoying. The instant invention avoids these disadvantages.

Coming first to the form of the invention shown in FIGS. 1–8, the in-line operation, the tubular plastic issues from the extruder and is indented at its opposite sides in a conventional manner by plates to form the gusseted tubular stock 30 which, as seen more clearly in FIG. 10, includes the front and back panels 12 and 14 and the side folds or gussets 16. This stock passes, if desired, through a printing station and then over guide rollers 31 through a perforating station 32.

The perforating station includes a lower member 34 which contacts the undersurface of the lower panel 14 of the tubular stock in a generally horizontal plane. The lower member includes indentations or cavities 36 arranged in a particular circuitous configuration, preferably a rectangle. The upper member 38 is carried by the piston 40 of an hydraulic cylinder 42, the member 38 including pointed male protuberances 44 complementary to the cavities 36 and adapted to pierce the panels 12 and 14 and the folds or gussets 16 when the members close upon each other to form the perforated area 46, see FIG. 9.

The stock then passes over an idler roller 46 and thence vertically downwardly between gripping rollers 48 which feed the stock through a heat sealing station 50 consisting of an anvil member 52 and a heater bar 54 on opposite sides of the stock movable towards and away from each other.

Beneath the heat sealing station, a gate member 56 is provided which is pivoted around a horizontal axis as at 58 on a table 60. The pivot rod 58 to which the gate is affixed is oscillated by a suitable motive mechanism, such as an hydraulic cylinder 62 which by suitable switches is synchronized with the movement of the heat sealer bar 54 and perforating members 34, 38.

As will be seen in FIG. 9, the closed line of perforations 46 are formed in the stock with their centers spaced apart twice the desired length of a bag. The synchronous timing relationship between the perforator, heat sealer and swinging gate is such htat when a transverse portion centrally between the perforated areas reaches the heating station 50, the next area of the stock to be perforated reaches the perforating station 32. The perforator closes against the stock to produce the perforations at the same time that the heater bar 54 moves toward the anvil 52 and closes against the stock. At the same time, the gate 56 has been actuated to swing in an arc upwardly as shown in FIG. 3.

At this point, attention is called to the fact that the heat sealer is designed to provide a relaxed seal. The heater bar attains a temperature of about 400–600° F. as compared, for example, to a melting temperature of about 160° F. for polyethylene. Thus when such a bar engages the stock for a fraction of a second it melts it, and when the bar is released from the stock because the plastic has a memory it shrinks to its cooled state immediately forming a relaxed weld 64 which is stronger because it is thicker than the added thicknesses of the panels 12 and 14, as indicated in FIG. 11.

Thus as stated hereinbefore, as the perforations are made in the stock and the heater bar engages the stock to form the weld, the movement of the stock is temporarily stopped. At this moment the gate 56 engages the stock at one side thereof beneath the heater bar (which is one bag length), as seen in FIG. 4, which engagement provides a force vector, substantially in the plane of the stock, downwardly and of sufficient magnitude to sever the stock longitudinally of the weld as at 65, see FIG. 11, the severance being aided by the fact that the heat remains applied to the stock while the pulling force is applied thereto. The perforator and heater bars then release their engagement with the stock and the gate 56, in its continued movement carries the bag 10 to the table on one side thereof.

At the next stage, a bag length of stock has moved through the heat sealing station 50, this time with the closed bottom and of the bag issuing first, as seen in FIG. 6. The heater bar 54 then closes against the stock transversely across the perforated area 46 bisecting it. While the perforator has not reclosed, the engagement of the heater bar against the stock temporarily stops its motion, at which point the upswinging gate 56 engages the other side of the stock, as seen in FIG. 7, and exerts a pulling force thereon severing the stock at the weld, as previously described with reference to FIG. 11, to produce the welds 66 at the top of the bag as seen in FIG. 9. Then the gate 56 carries the bag to the other side of the table and the machine cyclically repeats its operation. It will thus be seen from FIG. 2 that two piles of bags result in which all the bags are properly aligned, top versus top and bottom versus bottom, ready for packing and shipping as such. It is also possible to arrange the operation so that the weight of the bag is sufficient to cause the weld to pull apart along its length as it is being welded. In use, one need only tear out the semi-rectangular perforated portion 68 to produce the ultimate cut-out or waste portion 22 and arm holes 28, as seen in FIG. 15.

In the form of the invention shown in FIGS. 13 and 14, the tubuar stock 30 may issue from a roller instead of directly from the extruder and after passage over appropriate guide rollers 70 moves through the same perforating station 32 as described hereinbefore. It then passes through gripping rollers 72 and a horizontally disposed heat sealing station 74. The station generally comprises an enlarged roller 76 disposed beneath the stock and a heater bar 78 on the other side of the stock in opposition to the roller 76 and movable towards and away from the roller. The heater bar is of the same type as previously described, namely of such construction as to provide a strengthened relaxed weld.

Beyond the heat sealing station is a conveyor 80 including spaced rollers 82 and 84 over which are entrained endless belts 86. Adjacent and above the front end of the conveyor just beyond the heat sealing station, an additional upper conveyor 88 is provided which is spaced above the lower conveyor 80 and runs constantly therewith. At the front end of the upper conveyor, the same includes a bell crank-like member 88 consisting essentially of a pair of rollers 90 and 92 engaging the endless belts 94 of the conveyor, the rollers being carried by a member pivoted for vertical movement around a horizontal axis as at 96.

In operation of this form of the invention the stock 30 is fed through the heat sealing station at a particular stage. When a bag length 100 extends beyond the front sealer bar 78 and between the separated conveyor front rollers 82 and 92, as seen in FIG. 13, the perforate members 34 and 38 are actuated to close and form the perforations 46 in the front and back panels and gussets of the stock. At the same time, the heat sealer bar 74 closes on the stock against the back-up roller 76 to form the relaxed weld. The closing of the heat sealer bar and the perforator and their engagement thereby with the stock stops the forward movement thereof temporarily. Synchronous with this movement, a mechanism (not shown) is actuated to tilt the bell crank mechanism 88 about its axis 96 downwardly so that the opposed front rollers 82 and 92 pinch the bag length 100 of stock between them, as seen in FIG. 14. The continued movement of the rollers 82 and 92 applies a force against the stock in a direction away from the heat sealer bar causing the stock to sever at the weld at which point the heat sealer bar moves upwardly out of contact with the stock, the rollers 82 and 92 and the perforator members 34 and 38 separate. At the next bag length of travel of the stock, the same operation occurs except that the perforator members do not close against the stock, since the perforated area 46 is applied, center to center, every two bag lengths. As mentioned earlier, the heat sealing and simultaneous severing of the stock occurs transversely across the stock alternately centrally between the perforated areas to produce the bottom of the bag and transversely centrally across the perforated area to produce the top of the bag.

It should be noted that in both the in-line operation shown in FIGS. 1–8 and the horizontal operation shown in FIGS. 13 and 14, the heat sealer bar forms a relaxed weld and when a pulling force is exerted thereon the stock separates centrally and along the length of the weld so that when the bottom of the bag is welded, actually two adjacent bottoms are made at the same time and then separated along the weld, and when the top of the bag is welded, actually two adjacent tops are made at the same time across the perforated area and then separated along the weld.

Since the force severing the bag is applied while the heat of the sealer bar is being applied to the stock, the separation longitudinally at the weld is easily effected and no tail or edge beyond the weld results.

It should also be understood that while the perforation, heat sealer bar and pulling means (swinging member 56 or bell crank roller member 88) can be synchronized to move in timed relation by appropriate circuitry and relay switches, the timed relationship can be attained by separate operation of these members set up to function at times correlated with the function of the other members.

While the invention has been described in connection with the use of a perforator 74, it can also be employed with a cutting member 102 shown in FIG. 12 which comprises a lower member 104 engaging the lower surface of the plastic tubular stock 30, the lower member comprising a conduit 106 and an annular shoulder 108 having a continuous V-notch or cavity 110 opening therethrough in a desired configuration, as a rectangle similar to the perforated area 46. The cutting member also includes an upper member 112 which is carried by a piston rod slidable in a cylinder (as in the perforator), the upper member including a depending knife-edge male portion 114 complementary to the V-notch or cavity 110. Thus when the upper member 112 closes against the lower member 104, the knife-edge 114 enters the cavity 110 and in so doing cuts out, instead of merely perforating, an area equivalent to the perforated area 46. At this point in the operation, suction is applied to the conduit 106 to remove the cut-out or waste portion. When the cutter is used instead of the perforator, the heat sealing and separating operation to form the top of the bag occurs across a central open area and two end areas which become the handles of the bag.

While preferred embodiments of the invention have here been shown and described, it is understood that a skilled artisan may make minor variations without departing from the spirit of the invention.

I claim:

1. A method of making a bag of polyethylene resin having front and back panels joined at their bottom and top edges including infolded side gussets, a central fillable opening and lateral openings through the side gussets through which an arm can be extended, comprised of moving gusseted tubular stock through a perforator station and then a heat sealing station, applying a line of perforations in the front and back panels and the gussets forming a closed substantially rectangular area with rounded corners spaced along the length of the stock, applying a heat sealing member transversely across the stock between the perforated areas to weld the stock and form the bag bottoms and across the perforated areas to weld the stock and form the bag tops and a waste portion bounded by the perforations at a temperature of about 400–600° F. for a fraction of a second until the resin melts, applying a force substantially in the plane of the stock away from the heat sealing member while the latter is engaging and applying welding heat to the stock to cause the weld to sever longitudinally without opening the welds themselves, and simultaneously withdrawing the heat sealing member so that the resin shrinks as it cools due to its memory to form relaxed welds whose thickness exceeds the added thicknesses of the front and back panels, and removing the waste portion to form said fillable opening and said lateral openings.

2. The method of claim 1 wherein the force to sever the weld while it is forming is applied when the movement of the stock is temporarily halted and the stock is restrained by the heat sealing member.

3. The method of claim 1 wherein the stock passes vertically through the heat sealing station and a bag length extends beyond the heat sealing member and the bag is severed from the rest of the stock by applying a force arcuately and downwardly against one face of the bag while the welding heat is being applied to the stock.

4. The method of claim 1 wherein the stock passes horizontally through the heat sealing station and a bag length extends beyond the heat sealing member and the bag is severed by the application of a clamping rolling force to the bag horizontally away from the heat sealing member while the welding heat is being applied to the stock.

5. A method of making a bag of polyethylene resin having front and back panels joined at their bottom and top edges including infolded side gussets, a central fillable opening and lateral openings through the side gussets through which an arm can be extended, comprised of moving gusseted tubular stock through a perforator station and then a heat sealing station, cutting out a continuous substantially rectangular area with rounded corners from the front and back panels and gussets at longitudinally spaced intervals along the stock, applying a heat sealing member transversely across the stock between the cut-out areas to weld the stock and form the bag bottoms and across the cut-out areas to weld the stock and form the bag tops, fillable opening and lateral openings at a temperature of about 400–600° F. for a fraction of a second until the resin melts, applying a force substantially in the plane of the stock away from the heat sealing member while the latter is engaging and applying welding heat to the stock to cause the weld to sever longitudinally without opening the welds themselves, and simultaneously withdrawing the heat sealing member so that the resin shrinks as it cools due to its memory to form relaxed welds whose thickness exceeds the added thicknesses of the front and back panels.

References Cited

UNITED STATES PATENTS

| 3,008,865 | 11/1961 | Hayes et al. | 156—553 |
| 3,033,257 | 5/1962 | Weber | 156—251 |
| 2,252,733 | 8/1941 | Sherman et al. | 83—26 |
| 2,884,988 | 5/1959 | D'Angelo | 156—510 |
| 3,086,577 | 4/1963 | Crimple | 156—510 |
| 3,138,395 | 6/1964 | Mills | 156—510 |

BENJAMIN A. BORCHELT, Primary Examiner

J. V. DORAMUS, Assistant Examiner

U.S. Cl. X.R.

156—510, 553